United States Patent
Bhasin et al.

(10) Patent No.: US 6,880,120 B2
(45) Date of Patent: Apr. 12, 2005

(54) SEQUENCE-BASED VERIFICATION METHOD AND SYSTEM

(75) Inventors: Sudhir Bhasin, San Jose, CA (US); Anu Bachina, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 516 days.

(21) Appl. No.: 09/765,478

(22) Filed: Jan. 18, 2001

(65) Prior Publication Data

US 2002/0095634 A1 Jul. 18, 2002

(51) Int. Cl.[7] .......................... G01R 31/28; G06F 11/00; G06F 7/02
(52) U.S. Cl. .................. 714/736; 714/819; 716/5
(58) Field of Search .......................... 714/43, 724, 726, 714/731, 736, 744, 814, 819, 712–717; 703/13–16, 22; 716/4, 5; 324/158.1, 765; 710/100, 112, 306, 310, 316

(56) References Cited

U.S. PATENT DOCUMENTS

| | | | | |
|---|---|---|---|---|
| 5,937,182 A | * | 8/1999 | Allingham | 716/2 |
| 5,958,035 A | * | 9/1999 | Carter et al. | 710/306 |
| 6,073,194 A | * | 6/2000 | Lowe | 710/100 |
| 6,154,801 A | * | 11/2000 | Lowe et al. | 710/119 |
| 6,324,665 B1 | * | 11/2001 | Fay | 714/736 |
| 6,370,493 B1 | * | 4/2002 | Knapp et al. | 703/14 |

* cited by examiner

Primary Examiner—Guy J. Lamarre
Assistant Examiner—Cynthia Britt
(74) Attorney, Agent, or Firm—Osha & May L.L.P.

(57) ABSTRACT

A hardware verification method includes obtaining a set of packets to be driven by a device under test and obtaining a set of timing and relation criteria which determines a sequence in which the packets should be driven by the device under test. The method further includes starting multiple drive loops, each drive loop picking up a packet and forcing the device under test to drive the packet. The method further includes starting multiple expect loops, each expect loop determining when to expect a packet driven by the device under test and picking up the expected packet when it arrives. For each drive loop, the method confirms that the timing and relation criteria are satisfied prior to allowing the drive loop to force the device under test. For each expect loop, the method checks if the expected packet arrives within a specified time period and raises an error flag if the expected packet does not arrive within the specified time period.

20 Claims, 6 Drawing Sheets

SEQUENCE-BASED VERIFICATION METHOD AND SYSTEM

BACKGROUND OF THE INVENTION

1. Field of the Invention

The invention relates generally to hardware design and verification. More specifically, the invention relates to a method and system for verifying functionality of hardware components that move data between nodes in a computer (or network) system.

2. Background Art

A bus bridge is one example of a hardware component that moves data between nodes in a computer system. A bus bridge connects two distinct buses so that agents on one bus can contact agents on the other bus. The term agent, as used herein, is an entity that operates on a computer bus. Computer systems generally include multiple agents, e.g., processors, memory, hard disks, monitors, network adapters, etc. An agent that initiates a bus transaction is called a master or initiator, and an agent that responds to a bus transaction initiated by a master is called a slave or target. There may be several masters on a bus and one or more masters may request a bus transaction at any given time. Usually, arbitration processes are used to determine the order in which the transactions are processed. Transactions between a master on one bus and a slave on another bus involve the transfer of address and data information over the bus bridge together with exchange of timing and control information for synchronization and specification of the data format. The set of rules governing the bus transaction is called the bus protocol.

A master initiates a bus transaction with a slave by putting an address on the bus. The address is transferred to the other bus over the bus bridge. The slaves connected to the other bus compare this address with their addresses and become connected if a correspondence is found. Once a connection is established between the master and the slave, the master exchanges information with the slave. For a read operation, for example, the slave responds by reading data from the specified address and returning the data to the master. Each transfer of data between the master and the slave is called a bus cycle. A transaction usually takes more than one bus cycle. Each transfer of data between the master and the slave must be synchronized to ensure that the computer system works efficiently. The transfer timing may be fixed, in which case the master assumes that the slave can accept or provide data within a certain time. Alternatively, the transfer timing may be adjusted to the speed of a particular device by a process known as handshaking.

The primary function of the bus bridge is to move data from one bus to the other. To ensure that the bus bridge operates correctly, various schemes are used to verify the functionality of the bus bridge. The verification schemes typically fall under one of two categories: transaction based or memory-image based. Transaction-based verification schemes involve generating packets, i.e., blocks of data, at a source bus, sending the packets over the bus bridge, and checking the packets received at a destination bus. Each packet represents a bus transaction. For simple designs, there should be a one-to-one correspondence between the packets generated at the source bus and the packets received at the destination bus. Thus, finding design bugs such as dropped packets or spurious packets is relatively easy. Also, checking the destination bus as the packets are received as opposed to checking at the end of the test makes it easier to identify the source of the bug.

Transaction-based verification schemes are, however, difficult to implement for complex designs that have inbuilt intelligence and do operations like fragmentation and aggregation, i.e., splitting and joining, of packets. In such complex designs, determining one-to-one correspondence between the packets generated at the source bus and the packets received at the destination bus is not straightforward. For complex designs, memory-image-based verification schemes are preferred. Memory-image-based verification schemes involve associating a memory image with each bus connected to the bus bridge and giving each bus restricted write permissions on the associated memory. Design bugs are found by comparing the memories at the end of the test. This scheme is relatively easy to implement. However, it does not guarantee to find bugs such as dropped packets and spurious packets. In addition, finding the bug at the end of the test makes debugging very difficult.

U.S. Pat. No. 5,937,182 issued to Allingham discloses a verification method for bus bridges. In the verification method, simulated models of the bus bridge, the two buses connected to the bus bridge, and the devices connected to the buses are constructed. Then, an expect buffer is created at a test bench, and a set of events expected to occur during a time frame of interest for the simulation is loaded into the expect buffer. Each time an event occurs, e.g., each time a device connected to one of the buses writes data to a device connected to the other bus, the relevant device model notifies the test bench of a completed event. The test bench then searches the expect buffer for an entry matching the just-completed event. A matching event entry is removed from the expect buffer while the lack of a matching event entry triggers the system to flag the just-completed event as an unexpected event. When the simulation is complete, any remaining entries in the expect buffer are reported as missing events.

SUMMARY OF THE INVENTION

In one aspect, the invention relates to a hardware verification method which comprises obtaining a set of packets to be driven by a device under test and obtaining a set of timing and relation criteria which determines a sequence in which the packets should be driven by the device under test. The method further includes starting multiple drive loops, each drive loop picking up a packet and forcing the device under test to drive the packet. The method further includes starting multiple expect loops, each expect loop determining when to expect a packet driven by the device under test and picking up the expected packet when it arrives. For each drive loop, the method includes confirming that the timing and relation criteria are satisfied prior to allowing the drive loop to force the device under test. For each expect loop, the method includes checking if the expected packet arrives within a specified time period and raising an error flag if the expected packet does not arrive within the specified time period. In some embodiments, the method further includes monitoring an output of the device under test to determine whether a packet driven by the device under test is picked up by one of the expect loops and raising a flag if the packet is not picked up by one of the expect loops.

In another aspect, the invention relates to a hardware verification system which comprises one or more drive buffers for holding packets to be driven by a device under test and one or more buffers for holding a set of timing and relation criteria which determines a sequence in which the packets should be driven by the device under test. The hardware verification system further includes a drive module which starts multiple drive loops that pick up packets from the drive buffers and force the device under test to drive the packets. The drive module ensure that each drive loop satisfies specified timing and relation criteria prior to allowing the device loop to force the device under test. The hardware verification system further includes an expect module which starts multiple expect loops that pick up packets driven by the device under test. The expect module ensures that each expect loop satisfies specified timing and relation criteria prior to allowing the expect loop to expect and pick up a packet driven by the device under test. The expect module raises an error flag if the expected packet does not arrive within a specified time period. In some embodiments, the hardware verification system further includes a checker module which starts a process that checks and raises an error flag if a packet at an output of the device under test is not picked up by an expect loop.

Other features of the invention will be apparent from the following description and the appended claims.

DETAILED DESCRIPTION OF THE INVENTION

Embodiments of the invention provide a sequence-based verification method and system for verifying the functionality of hardware components which move data between nodes in a computer (or network) system. The verification method and system may be used to verify the functionality of the hardware component either upon its initial expression in a hardware description language ("HDL") or following actual hardware implementation.

The verification method involves generating a set of packets, each of which includes data to be transmitted from one node in the computer system to another node. Each packet also includes information such as when the data should be transmitted, how long it should take to transmit the data, how the packet relates to the other packets, etc. Using the information contained in the packets, timing and relation criteria are determined. The timing and relation criteria determine the sequence in which the packets should be transmitted. Using the predetermined sequence, the verification system presents the packets to the hardware component for transmission. The verification system then monitors the output of the hardware component to determine if the predetermined sequence is preserved. If the predetermined sequence is not preserved, the verification system raises an error flag. The verification system also checks for generation of spurious packets.

Figure 1:
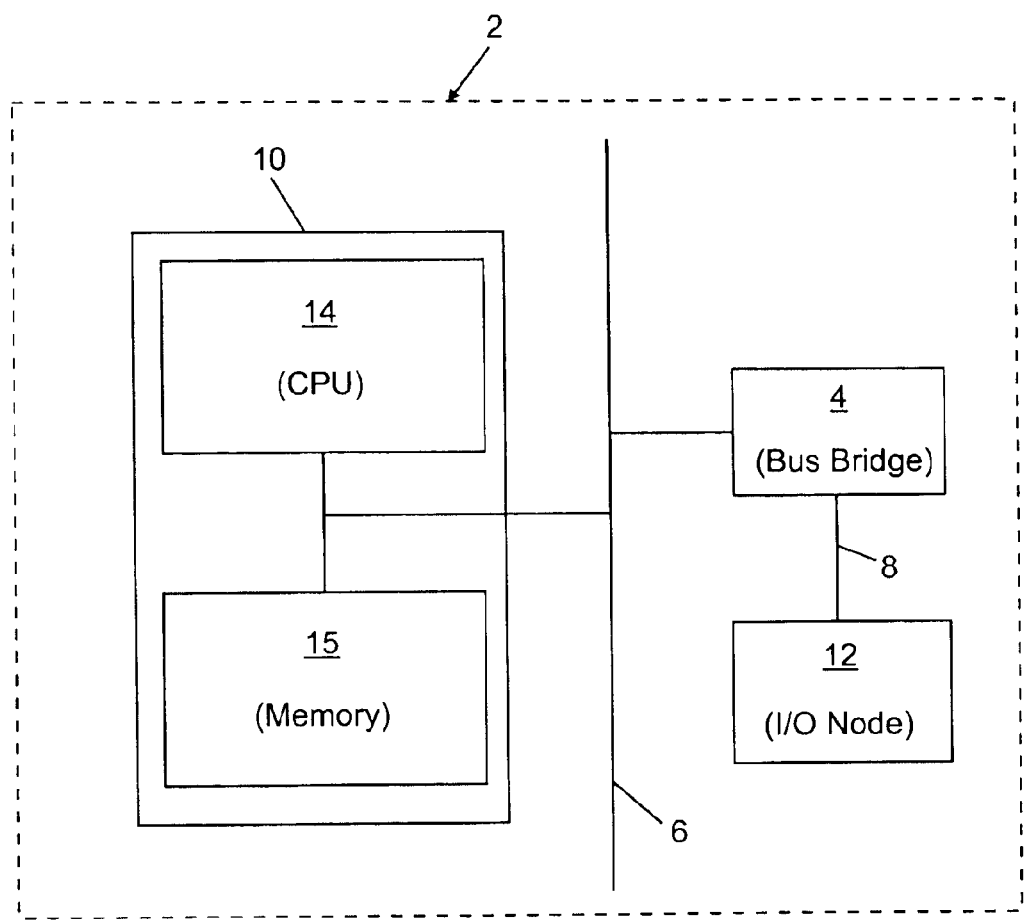
FIG. 1 illustrates a general circuit layout of a computer system.

Various embodiments of the invention will now be described with reference to the accompanying figures. FIG. 1 illustrates a layout of a computer system, generally indicated at 2, suitable for practicing the present invention. However, it should be clear that the invention is not limited to the illustrated computer system 2. Generally speaking, the invention can be practiced on any general purpose computer system or specialized computer system. The computer system 2 includes a bus bridge 4 which is connected to a system bus 6 and an input/output ("I/O") bus 8. A processor node 10 is attached to the system bus 6, and an I/O node 12 is attached to the I/O bus 8. The processor node 10 includes a central processing unit ("CPU") 14 and memory 15. The I/O node 12 includes one or more I/O devices (not shown), e.g., a monitor, network adapter, keyboard, etc. The CPU 14, memory 15, and bus bridge 4 exchange information through the system bus 6. The bus bridge 4 and I/O node 12 exchange information through the I/O bus 8. The function of the bus bridge 4 is to move data between the system bus 6 and the I/O bus 8.

Figure 2:
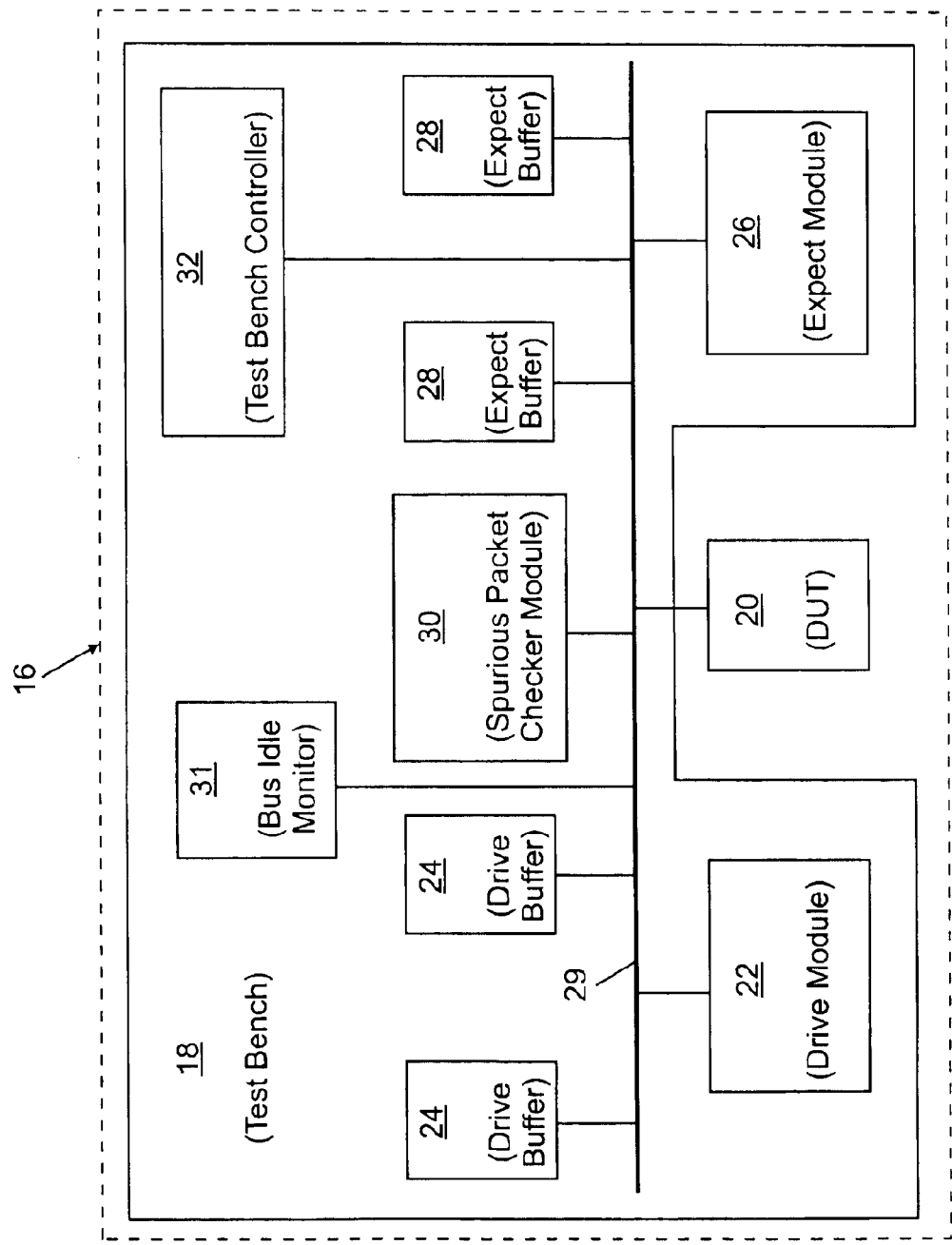
FIG. 2 shows a block diagram of a verification system in accordance with one embodiment of the invention.

FIG. 2 shows a block diagram of a verification system, generally indicated at 16, according to one embodiment of the invention. The verification system 16 includes a test bench 18 and a device under test ("DUT") 20. In one implementation, the test bench 18 includes a set of programs executable by a processor, e.g., the CPU 14 shown in FIG. 1. The primary functions of the test bench 18 are to specify the input to the DUT 20, to specify operational correctness and performance criteria of the DUT 20, and to specify operations to be performed when various ones of the operational correctness and performance criteria are satisfied or breached. In one implementation, the DUT 20 is a simulated design of a bus bridge. In alternate embodiments of the invention, the DUT 20 may be an actual hardware implementation of the bus bridge or may be any hardware component that moves data between nodes, e.g., a data switch. In one implementation, the DUT 20 is expressed in a HDL such as Verilog or VHDL and simulated using a simulator tool such as Verilog-XL from Cadence Design Systems. The simulator tool may be run on the CPU 14 (shown in FIG. 1) or on some other remote computer system.

The test bench 18 includes a drive module 22 that generates drive loops for the DUT 20 using data stored in one or more drive buffers 24. A buffer is basically any type of memory bank that holds data. The memory may be volatile or non-volatile. One or more drive loops are assigned to each driving port of the DUT 20. The test bench 18 further includes an expect module 26 that generates an expect loop for each drive loop. One or more expect loops are assigned to each driving port of the DUT 20. The purpose of the expect loops is to check if the DUT 20 drives data correctly. The expect loops pick up information from the expect buffers 28 and use this information to determine when to expect the DUT 20 to drive data. The drive loops and expect loops are processes running in loops. The processes run until certain prespecified conditions are met. In one implementation, the drive loops and expect loops are part of the test bench 18 application.

The test bench 18 further includes a spurious packet checker module 30 that checks for spurious packets generated during simulation of the DUT 20. The test bench 18 also includes a test bench controller 32 that coordinates communication between the components of the test bench 18 and the DUT 20. Communications between the components of the test bench 18 and the DUT 20 occur over bus 29. In the case of a bus bridge design verification, the test bench 18 also includes an arbiter (not shown), which may be added as a separate component or included in the test bench controller 32. Usually, the arbiter uses arbitration criteria defined in the bus specification to determine which drive loop has the permission to drive the DUT 20.

Figure 3:
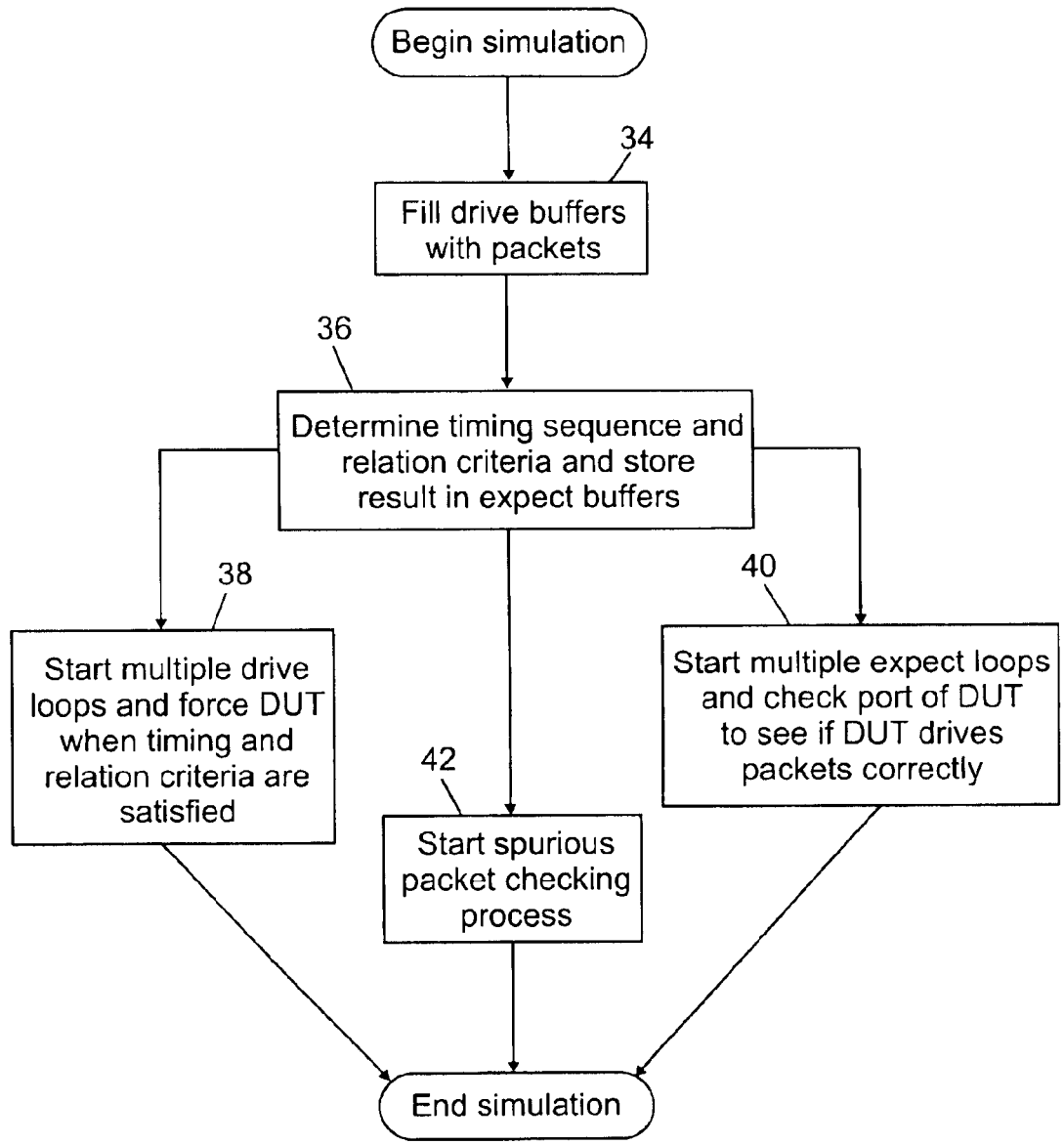
FIG. 3 shows a flowchart which illustrates a verification method in accordance with one embodiment of the invention.

FIG. 3 is a flowchart which illustrates the verification method of the present invention in accordance with one embodiment. The method starts, as shown at 34, with filling of the drive buffers (24 in FIG. 2) with valid data. The drive buffers 24 (shown in FIG. 2) can be filled with user-defined data or with randomly generated data. In general, the data in the drive buffers (24 in FIG. 2) are packets of information to be transferred between nodes in a computer system. In the case of a bus bridge design, each packet represents a bus transaction. Using the bus bridge 4 (shown in FIG. 1) as an example, the packets loaded into the drive buffers (24 in FIG. 2) would include messages to be transferred between the processor node (10 in FIG. 1) and the I/O node (12 in FIG. 1). A message can be a send or receive operation, a remote direct memory access ("RDMA") read or write operation, or other message to be transferred between the processor node (10 in FIG. 1) and the I/O node (12 in FIG. 1). For a send operation, the message specifies a block of data to be transferred from the processor node (10 in FIG. 1) to the I/O node (12 in FIG. 1). For a receive operation, the message specifies a location in the memory (15 in FIG. 1) where the data received from the I/O node (12 in FIG. 1) will be placed. A RDMA operation is a direct exchange of data between the processor node (10 in FIG. 1) and the I/O node (12 in FIG. 1).

After filling the drive buffers (24 in FIG. 2) with valid data, timing and relation criteria are determined and stored in the expect buffers (28 in FIG. 2). The relation criteria specify the order in which the packets should be transmitted. For example, one criteria may be that Packet A in one of the drive buffers (24 in FIG. 2) should be driven by the DUT (20 in FIG. 2) only when Packet B has been driven by the DUT (20 in FIG. 2). Timing criteria for a drive loop is a timing pattern defined by the test to force the drive loop to place a packet on the bus (29 in FIG. 2). A timing pattern may be set, for example, by specifying a certain amount of delay between packets or specifying a certain amount of delay after a certain event has occurred. The packets in the drive buffers (24 in FIG. 2) include timing information, e.g., when the packet should be driven on the bus as specified by test requirement, and relation information, e.g., which packets should be transmitted before another packet can be transmitted. This information along with DUT specification can be used to determine the timing and relation criteria.

After determining the timing and relation criteria, the drive module (22 FIG. 2) starts multiple drive loops, as shown at 38, for each packet in the drive buffers (24 in FIG. 2) and assigns the drive loops to the driving ports of the DUT (20 in FIG. 2). The drive loops force the DUT (20 in FIG. 2) to drive the packets when timing and relation criteria and arbitration criteria are satisfied. At the time the drive module (22 FIG. 2) creates the drive loops, the expect module (26 in FIG. 2) also creates multiple expect loops, as shown at 40. The expect loops pick up information from the expect buffers (28 in FIG. 2) and use the information to check if the DUT (20 in FIG. 2) drives the packets correctly. The drive loops and expect loops run until the drive buffers (24 in FIG. 2) and the expect buffers (28 in FIG. 2) are empty or an error flag is raised. An error flag is raised, for example, if an expect loop determines that a packet was not driven properly by the DUT (20 in FIG. 2). The expect loop notifies the test bench controller (32 in FIG. 2) if a packet was not driven properly by the DUT (20 in FIG. 2). At the time the drive loops and expect loops are started, the spurious packet checker module (30 in FIG. 2) also starts a process which checks for spurious packets, as shown at 42. An error flag is raised if any spurious packet is detected.

Figure 4:
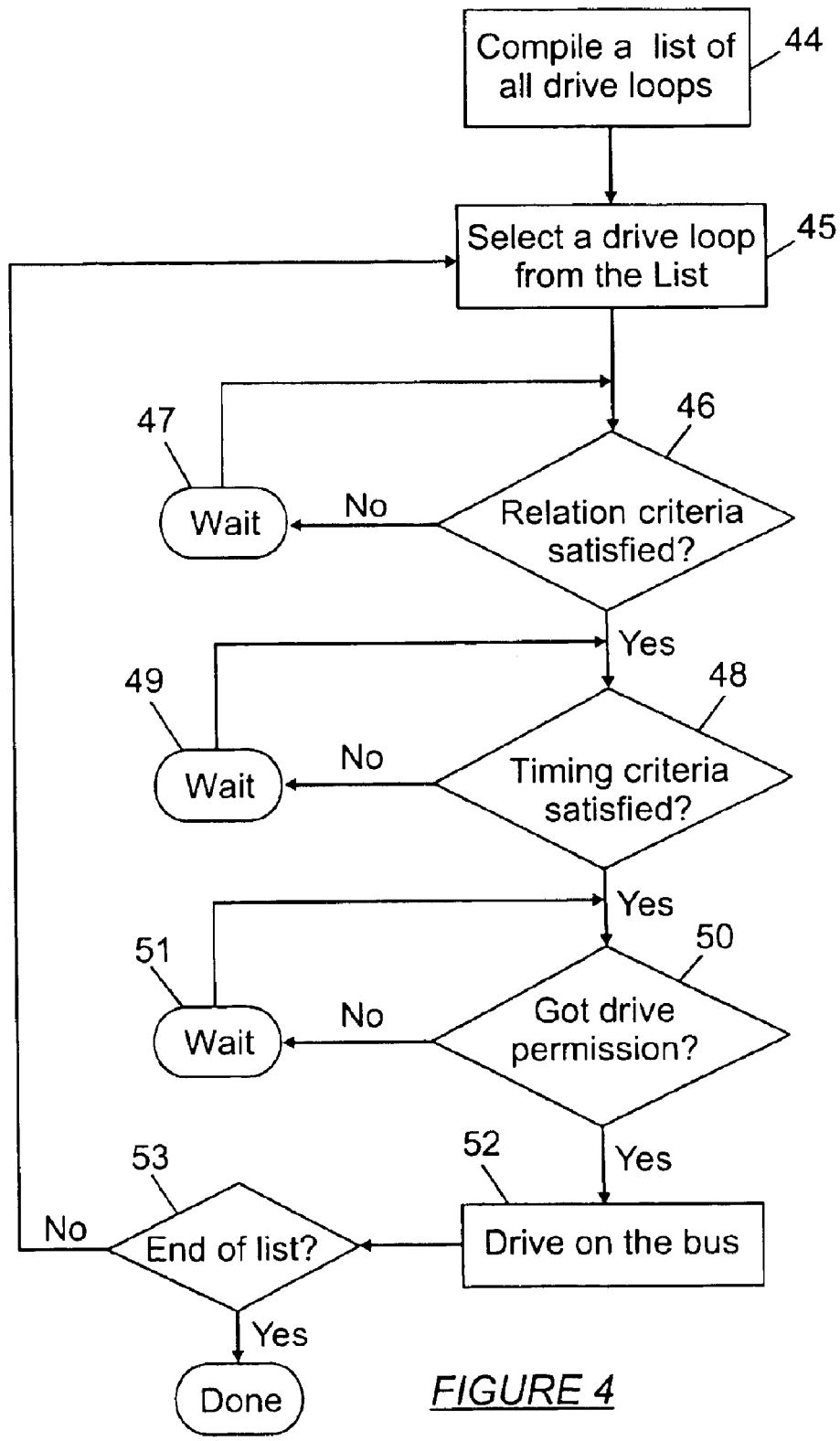
FIG. 4 shows a flowchart which illustrates a drive process in accordance with one embodiment of the invention.

FIG. 4 is a flowchart which illustrates how the drive module 22 manages the drive loops in accordance with one embodiment of the invention. The drive module 22 runs a process which compiles a list of all the drive loops, as indicated at 44. The drive loops on the list are in the order they will appear on the bus (29 in FIG. 2). The process then selects a drive loop on the list, usually starting from the first drive loop on the list, and checks to see if the selected drive loop satisfies the predetermined relation criteria. To do this, the selected drive loop communicates with the relevant drive and expect loops that should have already driven the DUT 20 to determine if they have done so. The drive loops drive the DUT 20 when they place a packet on the bus 29 to force the DUT 20 to operate. The expect loops drive the DUT 20 when they check the port of the DUT 20 to see if the DUT 20 drives a packet correctly. If the relevant drive and expect loops have driven the DUT 20, then the relation criteria are satisfied.

If the relation criteria are not satisfied, the process waits for a specified time period, as indicated at 47, and then checks again to see if the relation criteria are satisfied. If the relation criteria are satisfied, the process checks to see if the selected drive loop satisfies the predetermined timing criteria, as shown at 48. An example of a timing criterion may be that a certain amount of delay must occur before the selected drive loop can force the DUT (20 in FIG. 2). If the timing criteria are not satisfied, the process waits for a specified period of time, as indicated at 49, and then checks again to see if the timing criteria are satisfied. Again the selected drive loop communicates with the other drive and expect loops to determine if the timing criteria are satisfied. For example, suppose a Packet A has been driven by the DUT (20 in FIG. 2) and the Packet B corresponding to the selected drive loop can only be driven 20 microseconds after the DUT (20 in FIG. 2) has driven the Packet A. The selected drive loop checks with the drive loop for Packet B to see if the Packet B has been driven. If the Packet B has been driven, the selected drive loop checks with the expect loop for Packet B to determine when the Packet B was driven by the DUT (20 in FIG. 2). The selected drive loop then determines if 20 microseconds has expired since Packet B was driven by the DUT (20 in FIG. 2).

If the timing criteria are satisfied, the process checks to see if the selected drive loop has permission to drive the DUT 20, as shown at 50. The permission is obtained from the test bench controller (32 in FIG. 2), or from an arbiter if included in the test bench (18 in FIG. 2) as a separate component. If the drive loop does not have permission to drive the DUT (20 in FIG. 2), the process waits for a specified time period and then tries again to obtain permission to drive the DUT (20 in FIG. 2). When the drive loop receives permission to drive the DUT (20 in FIG. 2), such as when the BUS (29 in FIG. 2) is idle, the drive loop places the packet on the bus (29 in FIG. 2) and the packet is driven by the DUT (20 in FIG. 2). After the selected drive loop drives the DUT (20 in FIG. 2), the process checks to see if the end of the list has been reached, as shown at 53. If the end of the list has not been reached, the process selects the next drive loop on the list and repeats the steps above until the end of the list is reached. As will be further explained below, the process may be stopped prematurely if any error occurs, i.e., if the DUT (20 in FIG. 2) does not drive a packet correctly.

Figure 5:
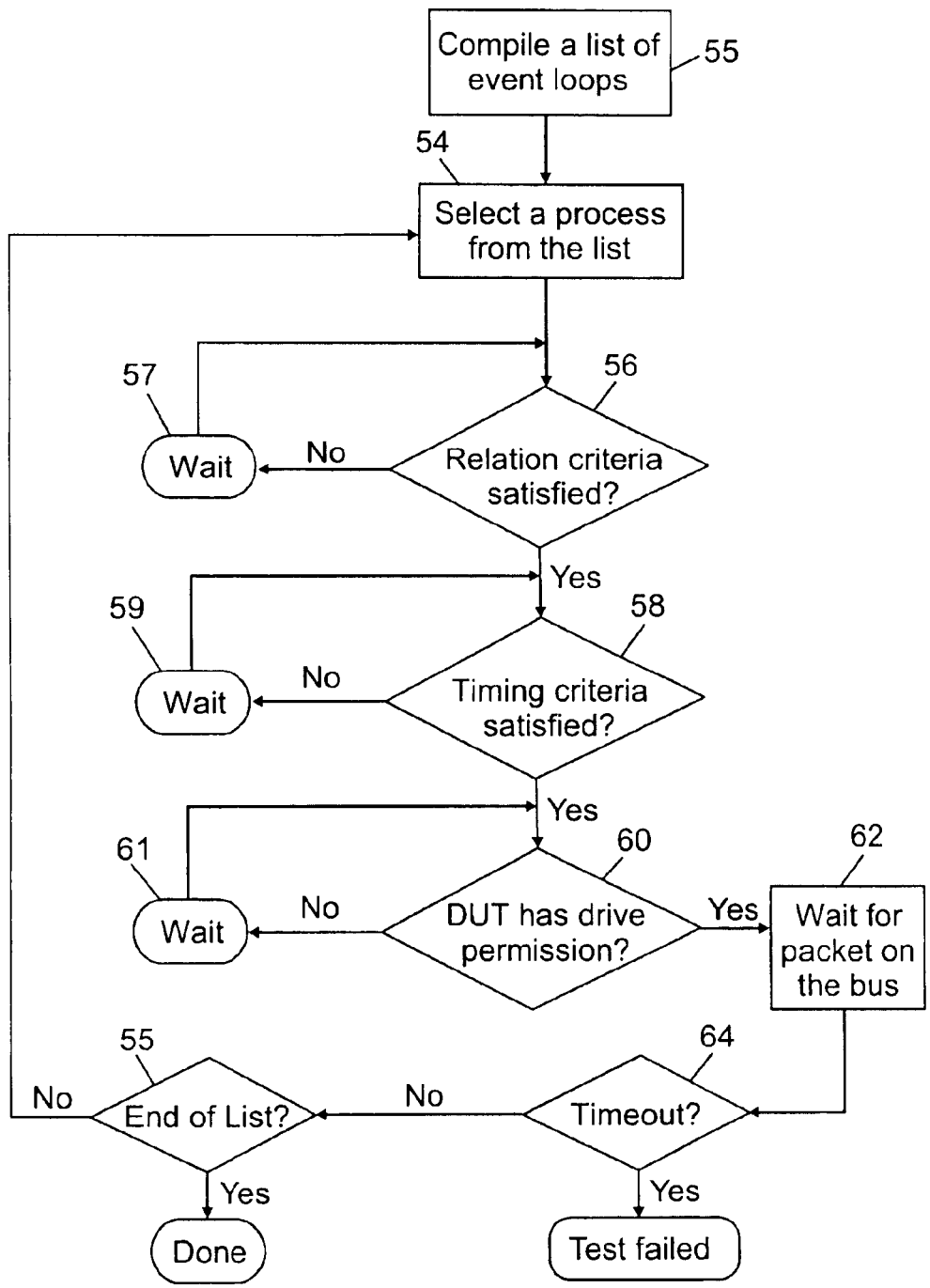
FIG. 5 shows a flowchart which illustrates an expect process in accordance with one embodiment of the invention.

FIG. 5 is a flowchart which illustrates how the expect module (26 in FIG. 2) manages the expect loops in accordance with one embodiment of the invention. The expect module (26 in FIG. 2) runs a process which compiles a list of all the expect loops, as indicated at 55. The expect loops on the list are in the order they will appear on the bus (29 in FIG. 2). As indicated at 54, the process selects an expect loop from the list, usually starting with the first entry in the list. The process checks to see if the selected expect loop satisfies the predetermined relation criteria, as indicated at 56. To do this, the selected expect loop communicates with the relevant expect and drive loops that should have already driven the DUT (20 in FIG. 2) to determine if they have done so. If the relevant drive and expect loops have driven the DUT (20 in FIG. 2), then the relation criteria are satisfied. If the relation criteria are not satisfied, the process waits for a specified time period, as indicated at 57, and then checks again for the relation criteria. If the relation criteria are satisfied, the process checks to see if the selected expect loop satisfies the predetermined timing criteria, as shown at 58. If the timing criteria are not satisfied, the process waits for a specified time period, as indicated at 59, and then checks again to see if the timing criteria are satisfied.

If the timing criteria are satisfied, the process checks to see if the DUT (20 in FIG. 2) has drive permission, as shown at 60. If the DUT (20 in FIG. 2) does not have drive permission, the process waits for a specified time period, as indicated at 61, and then checks again to see if the DUT (20 FIG. 2) has drive permission. If the DUT (20 in FIG. 2) has drive permission, the selected expect loop waits for a packet on the bus (29 in FIG. 2), as indicated at 62. The process checks to see if the packet arrives within a specified time period, as indicated at 64. If the packet does not arrive on the bus (29 in FIG. 2) within the specified time period, the process notifies the test bench controller (32 in FIG. 2) that the test has failed, and the test bench controller (32 in FIG. 2) in turn raises an error flag. The test bench controller 32 knows from the selected expect loop where the test failed. This information can be used to quickly identify the source of the bug in the design of the DUT (20 in FIG. 2). If the packet arrives within the specified time period, the expect loop picks up the packet, and the process checks to see if the end of the list has been reached, as indicated at 65. If the end of the list has not been reached, the process selects the next expect loop on the list and repeats the steps above.

Using the processes described in FIGS. 4 and 5, it is very easy to write a verification test that can cause the test bench (18 in FIG. 2) to hang, i.e., different loops keep on waiting for each other and nothing happens on the bus (29 in FIG. 2). To catch such deadlock problems, a bus idle monitor (31 in FIG. 2) is added to the test bench 18. The bus idle monitor (31 in FIG. 2) is a small process running in a loop which monitors the bus (29 in FIG. 2). If the bus idle monitor (31 in FIG. 2) finds that nothing is happening on the bus (29 in FIG. 2) for more than a specified time period, the bus idle monitor (31 in FIG. 2) informs the test bench controller 32 that the bus (29 in FIG. 2) has been idle for a long time. This causes the test bench controller 32 to raise an error flag and terminate the test.

Figure 6:
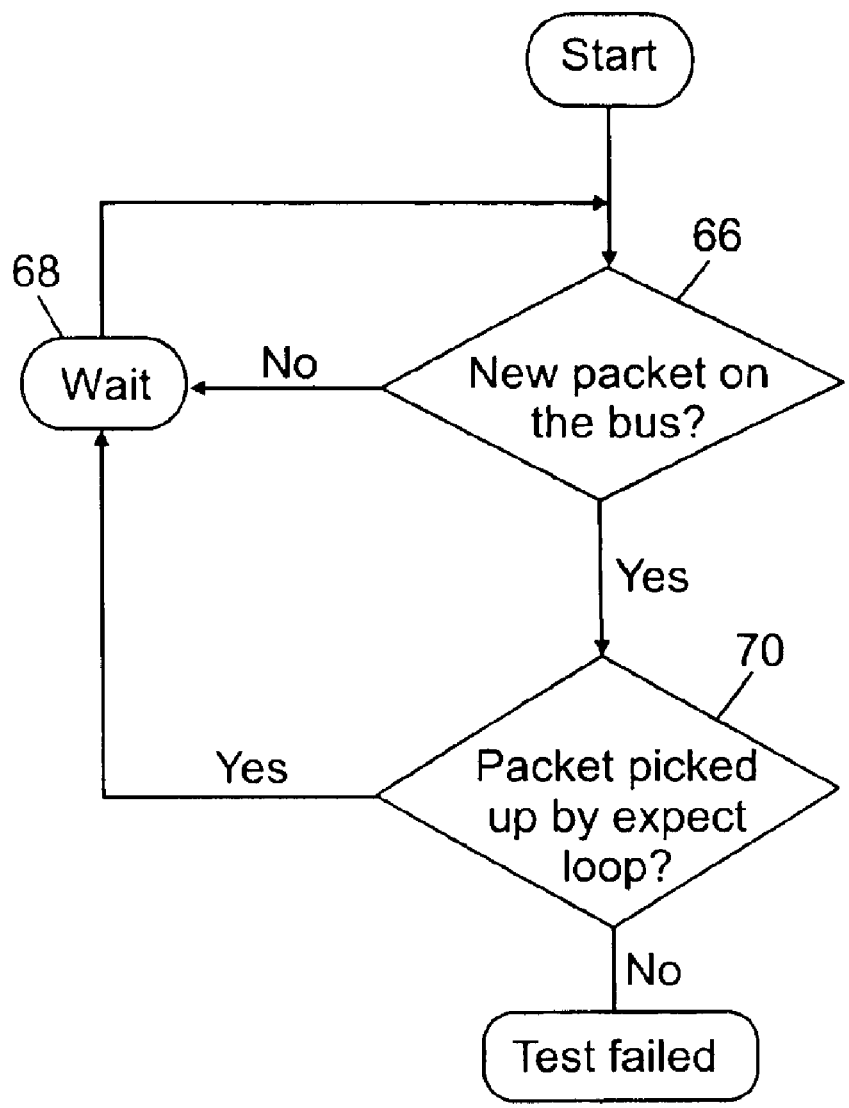
FIG. 6 shows a flowchart which illustrates a spurious packet checking process in accordance with one embodiment of the invention.

FIG. 6 is a flowchart which illustrates a spurious packet checking process in accordance with one embodiment of the invention. Basically, the spurious packet checking process checks to see if there is a new packet on the bus (29 in FIG. 2), as shown at 66. If there is no new packet on the bus (29 in FIG. 2), the process waits for a specified time period, as indicated at 68, and then checks again to see if there is a new packet on the bus (29 in FIG. 2). If there is a new packet on the bus (29 in FIG. 2), the process checks to see if the packet is picked by any expect loop, as shown at 70. If the packet is picked up, the process waits for a period of time, as shown at 68, and then checks again for a new packet on the bus (29 in FIG. 2). This process continues until the drive buffers (24 in FIG. 2) are empty. If a packet does not get picked by any expect loop, the spurious packet checking process notifies the test bench controller 32 that the test has failed and is terminated. Because the test-failed notification comes from the spurious packet checker module (30 in FIG. 2), the test bench controller 32 knows that a spurious packet has been generated. This information along with the currently selected drive and expect loops can be used to quickly determine the source of the bug.

The invention provides general advantages. The method and system of the invention provide a systematic approach to the process of verification by allowing a sequence of events to be specified and then checking to see if the device under test preserves the sequence of events. The idea is that if the sequence of events is preserved, the device under test functions correctly. The verification method is easy to implement, even for complex bus bridges and data switches. The method provides a complete check of logic and allows easy debugging because it catches the error at its first occurrence.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hardware verification method comprising:

obtaining a set of packets to be driven by a device under test;

obtaining a set of timing and relation criteria which determines a sequence in which the packets should be driven by the device under test, wherein obtaining the set of timing and relation criteria is dependent on at least one of when a packet should be transmitted, how long it should take to transmit the packet, and a relation of the packet to other packets;

starting multiple drive loops, each drive loop picking up a packet and forcing the device under test to drive the packet in accordance with the determined sequence;

starting multiple expect loops, each expect loop being configured to expect a packet driven by the device under test within a specified time period and picking up the expected packet if the expected packet arrives within the specified time period;

for each drive loop, confirming that the timing and relation criteria are satisfied prior to allowing the drive loop to force the device under test; and for each expect loop, checking if the expected packet arrives within a specified time period and raising an error flag if the expected packet does not arrive within the specified time period.

2. The method of claim 1 wherein allowing the drive loop to force the device under test further includes obtaining permission to drive the device under test.

3. The method of claim 1 wherein determining when to expect a packet driven by the device under test further includes determining if there is permission to drive the device under test.

4. The method of claim 1 wherein the device under test is a bus bridge.

5. The method of claim 1 wherein the device under test is a data switch.

6. The method of claim 1 further including monitoring an output of the device under test to determine whether a packet driven by the device under test is picked up by one of the expect loops and raising an error flag if the packet is not picked up by one of the expect loops.

7. The method of claim 1 wherein the expect and drive loops communicate over a bus, the method further comprising monitoring activity on the bus and raising an error flag if the bus is idle for more than a specified time period.

8. A hardware verification method comprising:
    obtaining a set of packets to be driven by a device under test;
    obtaining a set of timing and relation criteria which determines a sequence in which the packets should be driven by the device under test, wherein obtaining the set of timing and relation criteria is dependent on at least one of when a packet should be transmitted, how long it should take to transmit the packet, and a relation of the packet to other packets;
    starting multiple drive loops, each drive loop picking up a packet and forcing the device under test to drive the packet in accordance with the determined sequence;
    starting multiple expect loops, each expect loop being configured to expect a packet driven by the device under test within a specified time period and picking up the expected packet if the expected packet arrives within the specified time period;
    for each drive loop, confirming that the timing and relation criteria are satisfied prior to allowing the drive loop to force the device under test;
    for each expect loop, checking if the expected packet arrives within a specified time period and raising an error flag if the expected packet does not arrive within the specified time period; and
    monitoring an output of the device under test to see if a packet driven by the device under test is picked up by one of the expect loops and raising a flag if the packet is not picked up by an expect loop.

9. The method of claim 8 wherein allowing the drive loop to force the device under test further includes obtaining permission to drive the device under test.

10. The method of claim 8 wherein determining when to expect a packet driven by the device under test further includes determining if there is permission to drive the device under test.

11. The method of claim 8 wherein the device under test is a bus bridge.

12. The method of claim 8 wherein the device under test is a data switch.

13. The method of claim 8 wherein the expect and drive loops communicate over a bus, the method further comprising monitoring activity on the bus and raising an error flag if the bus is idle for more than a specified time period.

14. A hardware verification system, comprising:
    at least one drive buffer for holding packets to be driven by a device under test;
    at least one expect buffer for holding a set of timing and relation criteria which determines a sequence in which the packets should be driven by the device under test, wherein obtaining the set of timing and relation criteria is dependent on at least one of when a packet should be transmitted, how long it should take to transmit the packet, and a relation of the packet to other packets;
    a drive module which starts multiple drive loops that pick up packets from the drive buffer and force the device under test to drive the packets in accordance with the determined sequence, the drive module ensuring that each drive loop satisfies specified timing and relation criteria prior to allowing the drive loop to force the device under test; and
    an expect module which starts multiple expect loops that pick up packets driven by the device under test, the expect module ensuring that each expect loop satisfies specified timing and relation criteria prior to allowing the expect loop to expect and pick up a packet driven by the device under test, the expect module raising an error flag if the expected packet does not arrive within a specified time period.

15. The hardware verification system of claim 14 further including a spurious packet checker module which starts a process that checks and raises an error flag if a packet at an output of the device under test is not picked up by an expect loop.

16. The hardware verification system of claim 14 further including a controller which controls communication between the drive loops, expect loops, and the device under test.

17. The hardware verification system of claim 14 wherein the device under test is a bus bridge.

18. The hardware verification system of claim 14 wherein the device under test is a data switch.

19. The hardware verification system of claim 16 wherein the communication occurs over a bus.

20. The hardware verification system of claim 19 further comprising a bus idle monitor which monitors activity on the bus and sends an error notification to the controller if the bus is idle for more than a specified time period.

* * * * *